US 8,424,801 B2

(12) United States Patent
Wildman et al.

(10) Patent No.: US 8,424,801 B2
(45) Date of Patent: Apr. 23, 2013

(54) SLAT SUPPORT ASSEMBLY

(75) Inventors: Eric Wildman, Bristol (GB); Simon John Parker, Bristol (GB); Anthony Bryant, Wotton-under-Edge South Gloucestershire (GB); Christian Folkard, Bristol (GB)

(73) Assignee: Airbus Operations Limited, Bristol (GB)

( * ) Notice: Subject to any disclaimer, the term of this patent is extended or adjusted under 35 U.S.C. 154(b) by 45 days.

(21) Appl. No.: 13/064,754

(22) Filed: Apr. 13, 2011

(65) Prior Publication Data

US 2011/0253832 A1 Oct. 20, 2011

(30) Foreign Application Priority Data

Apr. 13, 2010 (GB) .................................. 1006099.4
Aug. 3, 2010 (GB) .................................. 1013050.8

(51) Int. Cl.
*B64C 13/28* (2006.01)

(52) U.S. Cl.
USPC ......... 244/99.2; 244/99.3; 244/213; 244/214; 244/215

(58) Field of Classification Search ................. 244/99.2, 244/99.3, 213–217; 16/366–371
See application file for complete search history.

(56) References Cited

U.S. PATENT DOCUMENTS

| 1,138,715 | A | * | 5/1915 | Young ............................. 74/521 |
| 2,579,534 | A | * | 12/1951 | Anderson et al. ............. 244/216 |
| 4,470,569 | A | | 9/1984 | Shaffer et al. |
| 5,651,513 | A | * | 7/1997 | Arena ........................... 244/99.3 |
| 6,010,097 | A | | 1/2000 | Cox |
| 7,484,694 | B2 | | 2/2009 | Perez-Sanchez |
| 8,104,710 | B2 | * | 1/2012 | Harvey et al. ................ 244/99.2 |
| 8,240,637 | B2 | * | 8/2012 | Hannewald ................... 251/229 |
| 2007/0102587 | A1 | | 5/2007 | Jones et al. |
| 2009/0134281 | A1 | | 5/2009 | Engelbrecht |
| 2009/0200420 | A1 | * | 8/2009 | Harvey et al. ................ 244/99.3 |
| 2011/0001015 | A1 | * | 1/2011 | Kracke ........................ 244/213 |
| 2011/0006155 | A1 | * | 1/2011 | Kracke ........................ 244/99.3 |
| 2011/0168849 | A1 | * | 7/2011 | Parker ......................... 244/214 |
| 2012/0011950 | A1 | * | 1/2012 | Kracke ........................ 74/89.23 |

FOREIGN PATENT DOCUMENTS

EP 1 338 506 8/2003

(Continued)

OTHER PUBLICATIONS

UK Search Report for GB No. 1013050.8, dated Nov. 23, 2010.

(Continued)

*Primary Examiner* — Philip J Bonzell
(74) *Attorney, Agent, or Firm* — Nixon & Vanderhye P.C.

(57) ABSTRACT

A support assembly for deployment and retraction of an aero surface from an aircraft is disclosed. The assembly comprises a guide track, a primary support arm having one end coupled to a carriage mounted on the track such that the primary support arm is rotatable relative to the carriage about multiple axes, and a control arm having one end coupled to the primary support arm and a second end pivotably attachable to a fixed support forming part of the structure of the aircraft. The assembly being configured such that, when the carriage is driven along the guide track, the control arm causes the primary support arm to pivot about said multiple axes to deploy and/or retract an aero surface pivotally attached to an opposite end of the primary support member along an arcuate path.

27 Claims, 9 Drawing Sheets

FOREIGN PATENT DOCUMENTS

| | | |
|---|---|---|
| EP | 1 985 893 | 10/2008 |
| EP | 2 272 752 | 1/2011 |
| GB | 2 186 849 | 8/1987 |
| GB | 2 402 914 | 12/2004 |
| WO | WO 2010/026410 | 3/2010 |
| WO | WO 2010/122324 | 10/2010 |

OTHER PUBLICATIONS

UK Search Report for GB No. 1006099.4, dated Jul. 20, 2010.
Extended European Search Report dated May 9, 2012 in EP 11161067.1-2422/2433863.

* cited by examiner

SLAT SUPPORT ASSEMBLY

This application claims priority to GB Application No. 1006099., filed 13 Apr. 2010, and GB Application No. 1013050.8, filed 3 Aug. 2010, the entire contents of each of which are hereby incorporated by reference.

INTRODUCTION

The present invention relates to a support assembly for supporting the slats on the leading edge of an aircraft wing and which is operable to deploy, and retract, the slats from the wing to control lift during flight. The invention also relates to an aircraft wing comprising at least one slat attached to a leading edge of the wing using the support assembly of the invention.

BACKGROUND

Aircraft need to produce varying levels of lift for take-off, landing and cruise. A combination of wing leading and trailing edge devices are used to control the wing coefficient of lift. The leading edge device is known as a slat. On larger aircraft there may be several slats spaced along the wing edge. During normal flight the slats are retracted against the leading edge of the wing. However, during take-off and landing they are deployed forwardly of the wing so as to vary the airflow across and under the wing surfaces. The slats usually follow an arcuate or curved path between their stowed and deployed positions. By varying the extent to which the slat is deployed along said path, the lift provided by the wing can be controlled.

An assembly is required to support and guide movement of a slat between stowed and deployed positions and a typical arrangement showing a cross-section through part of a wing 1 and a slat 2 in its stowed position is illustrated in FIG. 1. As can be seen from FIG. 1, the slat 2 is provided with an arcuate support arm or slat track 3 one end 4 of which is attached to the rear of the slat 2 and extends into the wing 1. To allow for wing bending and manufacturing tolerances, the end 4 of the slat track 3 is attached to the slat using spherical bearings and linkages (not shown). The slat track 3 penetrates wing spar 6 forming the wing structure. The slat track 3 defines an arc having an axis and is mounted within the wing so that it can rotate about that axis (in the direction indicated by arrows "A" and "B" in FIG. 1) to deploy and retract the slat 2 attached to one end of the slat track 3.

To drive the slat track 3 so as to deploy or retract the slat 2, a toothed slat track rack 7 having an arcuate shape corresponding to the arcuate shape of the slat track 3 is mounted within a recess 3*a* on the slat track 3 and a correspondingly toothed drive pinion 8 is in engagement with the teeth 7*a* on the slat rack 7 so that when the drive pinion 8 rotates, the teeth 8*a* on the drive pinion 8 and the teeth 7*a* on the rack 7 cooperate to pivot or drive the slat rack 7 and the slat attached thereto, into a deployed position, i.e. in the direction of arrow "A" in FIG. 1. Typically, the slat track 3 rotates through an angle of 27 degrees between its fully stowed and fully deployed positions. Rotation of the pinion 8 in the opposite direction also drives the slat track 3, in the direction of arrow "B", back into its stowed position, as shown in FIG. 1.

The drive pinion 8 is mounted on a shaft 9 that extends along, and within, the leading edge of the wing 1. Several gears 8 may be rotatably mounted on the shaft 8, one for driving each slat 2 so that when the shaft 9 is rotated by a slat deployment motor close to the inboard end of the wing t, all the slats are deployed together.

The slat track 3 is supported between roller bearings 10*a*, 10*b* both above and below the slat track 3 and the axis of rotation of each bearing 10*a*, 10*b* is parallel to the axis of rotation of each of the other bearings 10*a*, 10*b* and to the axis about which the slat track 3 rotates in the direction of arrows "A" and "B" between its stowed and deployed positions. The upper bearings 10*a* lie in contact with the upper surface 3*b* of the slat track 3 and the lower bearings 10*b* lie in contact with the lower surface 3*c* so that they support the slat track 3 and guide it during deployment and retraction. The bearings 10*a*, 10*b* resist vertical loads applied to the slat 2 during flight and also guide movement of the slat track 2 during slat deployment and retraction.

It will be appreciated that space for components within the wing structure close to the leading edge of the wing 1 is very limited. The requirement to house all these components places considerable design restrictions on the shape of the wing 1 in addition to increasing weight, manufacturing costs and complexities.

A further disadvantage with the conventional assembly described above is that the slat track 3 must be relatively long to accommodate the desired maximum deployment angle for the slat 2 whilst ensuring that the slat track 3 is adequately supported by two vertical load bearings 10*a* above the slat track 3 and two vertical load bearings 10*b* below the slat track 3, even at maximum deployment. As a result of its extended length, the slat track 3 penetrates the spar 6 and so the free end of the slat track 3 must be received within a track can 13 that separates the slat track 3 from the fuel stored within the wing 1 behind the spar 6. However, it is undesirable to have openings in the spar 6 as this can weaken the wing structure and so reduce its resistance to bending. It will also be appreciated that the requirement for a track can 13 also presents additional problems and assembly issues with the need to provide an adequate seal where the track can 13 is attached to the spar 6 so as to prevent fuel leakage.

The present invention seeks to provide a slat support and deployment assembly for an aircraft which does not penetrate the spar and so substantially overcomes or alleviates the problems referred to above.

An assembly which seeks to address the problems identified above has already been proposed and will now be described, prior to describing the slat support and deployment assembly of the present invention.

Referring to FIGS. 2 and 3, there is shown part of a structural rib 15 of an aircraft wing and a slat deployment assembly 16. The wing has a number of ribs 15 parallel to and spaced from each other along the length of the wing, although only two such ribs 15 are shown in FIGS. 2 and 3. Each rib 15 has an opening 17 therethrough in which is received and mounted a linear and rotary tube bearing (not shown).

The assembly 16 comprises a rigid tube 18 that extends along the length of the wing through the opening 17 in each rib 15. The tube 18 is received within the bearing in each rib 15 so that it is able to slide in a longitudinal direction (i.e. in the direction of axis 'A' in FIG. 2) through each rib 15 and also so that it can rotate about its longitudinal axis "A". A drive motor (not shown) is mounted within the wing structure and is operable to slide and rotate the tube 18 during deployment and retraction of a slat.

Although the slat support assembly 16 may comprise only a single tube 18 driven by a single motor for simultaneous deployment of all the slats associated with a particular wing, it is envisaged that there may also be multiple tubes 18, each with their own drive motor, so that each or certain slats may be driven independently as required.

The slat support assembly 16 also comprises a linkage or scissor mechanism including a primary support arm 19 having a first end 19a connected to the tube 18 and a second end 19b for connection to a slat to be deployed. The slat support assembly 16 also includes a control arm 20 coupled between the rib 15 and the primary support arm 19 between its first and second ends 19a,19b, as will now be explained in more detail.

The tube 18 extends through a stirrup 21 formed at the first end 19a of the primary support arm 19 and the primary support arm 19 is pivotally coupled to the tube 18 so that the primary support arm 19 can rotate about an axis 'B' that extends through stub axles 22 that extend from diametrically opposite surfaces of the tube 18 and which are received in corresponding holes 23 formed in each leg portion 21a, 21b of the stirrup 21.

The second end of the primary support arm 19b has a cylindrical aperture 24 to receive a pivot pin (not shown) which is coupled to the inboard end of a slat (not shown) so that the primary support arm 19 and slat can rotate relative to each other about the longitudinal axis 'C' of this pin during deployment and retraction of the slat.

The control arm 20 comprises a hub 25 (see FIG. 3) which is received within an aperture 26 in the primary support arm 19 roughly midway between its first and second ends 19a, 19b. The hub 25 has a pin 27 that locates in holes 28 in the primary support arm 19 so that the primary and secondary support arms 19, 20 can rotate relative to each other about an axis D extending through the hub 25.

The control arm 20 has a forked arm sections 20a extending away from a body portion 20b pivotally connected to the hub 25 for rotation about an axis E (see FIG. 3). The forked arm sections 20a extend away from the body portion 20b at a divergent angle from each other. A minor hub 29 is formed at the end of each of the forked arm sections 20a and these minor hubs 29 are received within corresponding apertures 30 in the rib 15. The hubs 29 are pivotally coupled to the rib 15 using pins (not shown) that extend through the rib 15 into the each hub 29 so that the control arm 20 can pivot relative to the rib 15 about an axis 'F' that intersects the longitudinal axis A of the tube 18.

It will be noted that the axes 'C' and 'D' are parallel to each other and remain so during deployment and retraction of a slat. However, axis 'F' extends at an angle relative to axes 'C' and 'D' i.e. it is displaced through a compound angle in both directions so that it is rotated about the longitudinal axis 'A' of the tube as well as being displaced through an angle such that it not perpendicular to the longitudinal axis 'A' of the tube. This arrangement produces an arcuate path to the free end of the primary support arm 19 when the tube 18 is both slid laterally and rotated about its longitudinal axis 'A'.

To deploy a slat from an aircraft wing that has been coupled using the above-described mechanism, the motor is driven so as to cause the tube 18 to slide in a longitudinal direction through the bearings (i.e. in the direction of arrow "P"). In addition to the sliding movement of the tube 18, the motor is also configured so as to cause simultaneous rotation of the tube 18 about its longitudinal axis 'A', through an angle that is in the region of 15 degrees. This longitudinal and rotational movement of the tube 18 causes the primary support arm 19 to rotate relative to the tube 18 about the axis 'B' and relative to the control arm 20 about the axis D. Furthermore, the body portion 20b of the control arm 20 rotates relative to the hub 25 about axis 'E' and the hubs 29 rotate relative to the rib 15 about axis 'F' so that the end 19b of the primary support arm 19 moves in a direction away from the tube 18 (as indicated by arrow "X" in FIG. 2) in an arcuate path so as to deploy the slat laterally from the wing edge, the primary support arm 19 also rotating relative to the slat about axis 'C' during this movement.

The primary support arm 19 moves in the opposite direction when the motor is driven in reverse so as to slide the tube 18 in the opposite direction so as to retract the slat.

It will be appreciated that the primary support member 19 and the control arm 20 both rotate together with the tube 18, such that the axes B, C and D all remain parallel throughout the rotational movement of the tube 18.

Although the above-described slat control mechanism overcomes or alleviates some of the disadvantages of the conventional support assembly, as it does not penetrate a spar or require a track can extending into the fuel tank within the wing structure, it still presents a number of drawbacks. In particular, the bearings received within the ribs must be capable of withstanding sliding and rotational motion as well as spherical movement to accommodate misalignment driven by wing bending and manufacturing tolerances, thereby increasing complexity and wear characteristics.

The present invention seeks to provide a slat support assembly that overcomes or substantially alleviates the disadvantages with the assembly described in more detail above.

SUMMARY OF THE INVENTION

According to the invention, there is provided a support assembly for deployment and retraction of an aero surface from an aircraft, the assembly comprising a guide track, a primary support arm having one end coupled to a carriage mounted on the track such that the primary support arm is rotatable relative to the carriage about multiple axes, and a control arm having one end coupled to the primary support arm and a second end pivotably attachable to a fixed support forming part of the structure of the aircraft, wherein the assembly is configured such that, when the carriage is driven along the guide track, the control arm causes the primary support arm to pivot about said multiple axes to deploy and/or retract an aero surface pivotally attached to an opposite end of the primary support member along an arcuate path.

Preferably, said one end of the control arm is coupled to the primary support arm at a position spaced from either end of said primary support arm. Most preferably, said one end is coupled to the primary support arm roughly midway between the ends of the primary support arm.

Although the assembly of the invention is primarily intended for use in controlling the deployment and retraction of a slat or flap from an aircraft wing, it could also be used to control any other aero surfaces including spoilers. It is also envisaged that it could be used to control, for example, the opening and closing of landing gear doors.

In a preferred embodiment, the slat support assembly comprises a drive member extending along the fixed guide track, the drive member being coupled to the carriage such that the carriage is movable along the guide track in response to rotation of the drive member.

Preferably, the guide track comprises a recess extending along its length, the drive member being received within said recess. The carriage may include a drive coupling portion that is received in said recess when said carriage is mounted on the track. In one embodiment, the drive member comprises a threaded shaft that extends through the drive coupling portion of the carriage and mates with a complimentary thread formed therein such that the carriage moves along the guide track in response to rotation of the threaded shaft.

The guide track preferably has a mounting flange for connection of the guide track to a fixed support forming part of the structure of the aircraft, and a carriage mounting portion extending from said mounting flange, the flange and carriage mounting portion being connected to each other by a necked region.

In a preferred embodiment; the carriage has an opening to receive the carriage mounting portion of the guide track such that the carriage mounting portion is surrounded by the carriage with the carriage mounting portion extending through said opening.

Preferably, the opening in the carriage has overhanging regions that extend into a space between the flange and the carriage mounting portion towards the necked region so that the carriage surrounds the carriage mounting portion.

The carriage mounting portion may have an outer surface that defines a plurality of bearing surfaces that extend along the length of the guide track.

Preferably, the carriage has bearing apertures therein and bearings received in said apertures with bearing surfaces that lie in rolling contact with the bearing surfaces on the carriage mounting portion.

The carriage mounting portion may have two upper bearing surfaces and two lower bearing surfaces, each of the upper and each of the lower bearing surfaces being arranged at an angle relative to its other upper and lower bearing surface, respectively.

The apertures in the carriage may include two upper angled bearing apertures mounting upper bearings with their axes of rotation at an angle to each other corresponding to the angle of the upper bearing surfaces and, two lower bearing apertures mounting lower bearings with their axes of rotation at an angle to each other corresponding to the angle of the lower bearing surfaces.

It will be appreciated that the carriage may house multiple bearings that act on each of the upper and lower bearing surfaces. For example, there may be eight bearings, two being associated with each bearing surface, to ensure a wide footprint or wheelbase for the carriage.

In one embodiment, the angle between each of the upper bearings and each of the lower bearings is 45 degrees, respectively.

In another unillustrated embodiment, the use of roller bearings may be avoided altogether by providing the carriage with low friction plain bearing surfaces that interact with low friction flat faces of the track, thereby reducing overall weight of the assembly.

In a preferred embodiment, the carriage comprises a body in which the opening is formed, the body also comprising spaced parallel wall portions extending therefrom in a direction away from the opening and the guide track, the carriage also comprising an axle that extends between, and is pivotally mounted to, the spaced parallel wall portions for rotation of the axle about a first axis relative to the body.

One end of the primary support member is pivotally coupled to the axle for rotation about a second axis relative to the axle and to the carriage.

The first and second axes can be arranged at 90 degrees to each other.

In one embodiment, the primary support member comprises a pair of upper and a pair of lower arm portions, each of the upper arm portions and each of the lower arm portions extending in opposite directions from an intermediate mounting boss located between the ends of the primary support member.

A shaft preferably extends between the intermediate mounting bosses of the upper and lower arm portions, said shaft including a part-spherical male bearing surface.

The control arm may have a collar at one end defining a part-spherical female bearing surface that mates with the female bearing surface on the shaft such that the control arm and primary support member can rotate relative to each other in any direction about said spherical bearing.

According to the present invention, there is also provided an aircraft wing assembly, including a slat and a slat support assembly according to the invention.

DESCRIPTION OF THE DRAWINGS

Embodiments of the invention will now be described, by way of example only, with reference to FIGS. 4 to 8 of the accompanying drawings, in which.

DESCRIPTION OF THE PREFERRED EMBODIMENTS

Figure 1:
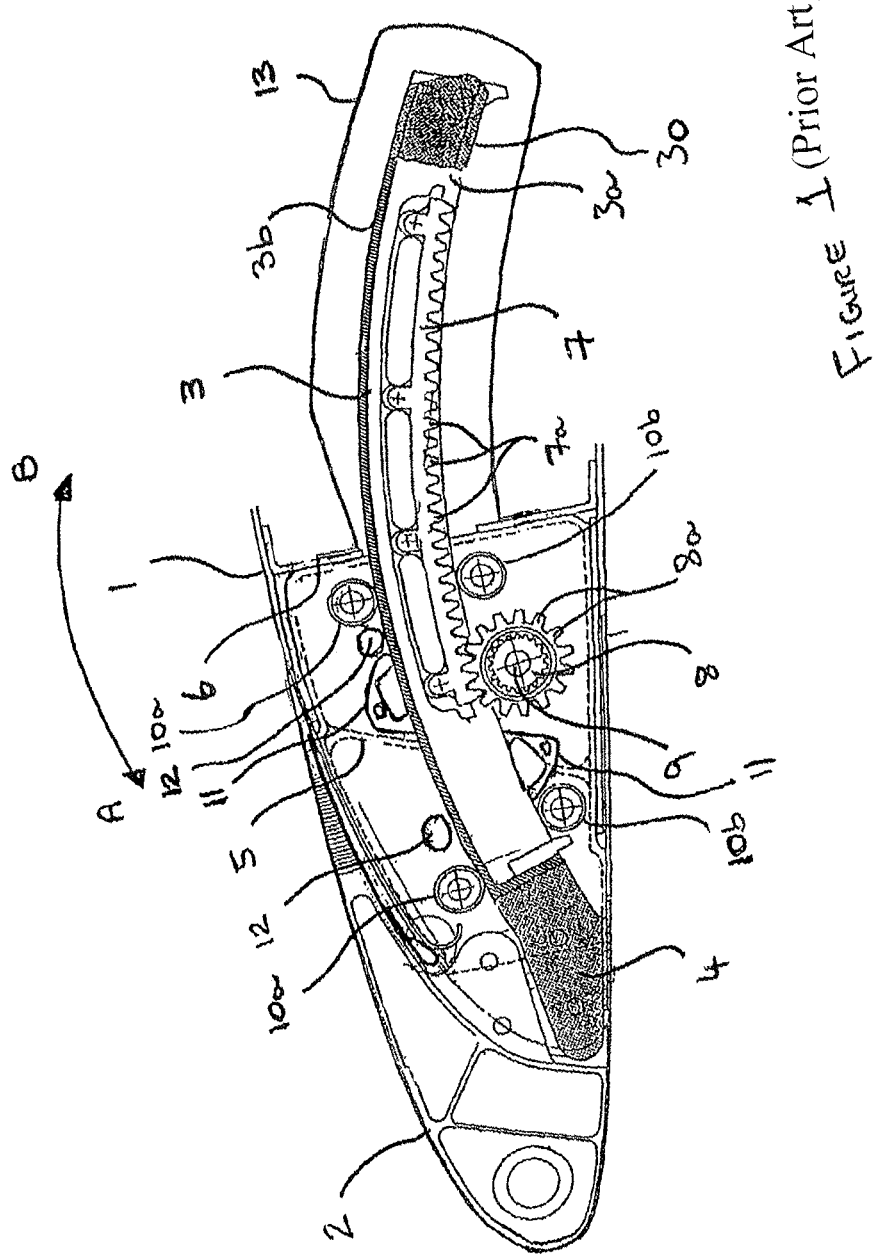
FIG. 1 is a side sectional view showing a known aircraft slat support assembly.
Figure 2:
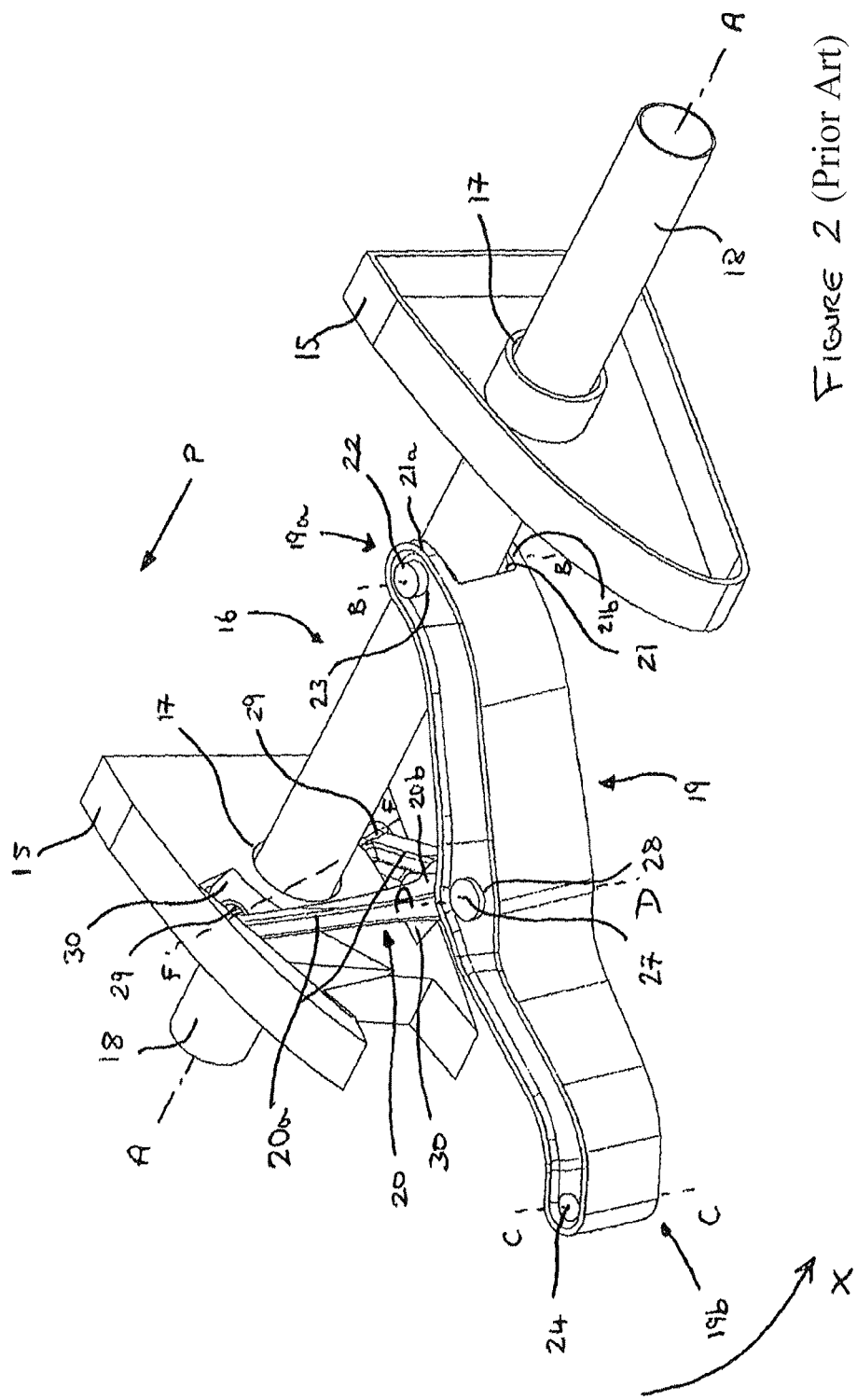
FIG. 2 is a first perspective view of a slat support assembly that overcomes many of the disadvantages of the known slat support assembly shown in FIG. 1.
Figure 3:
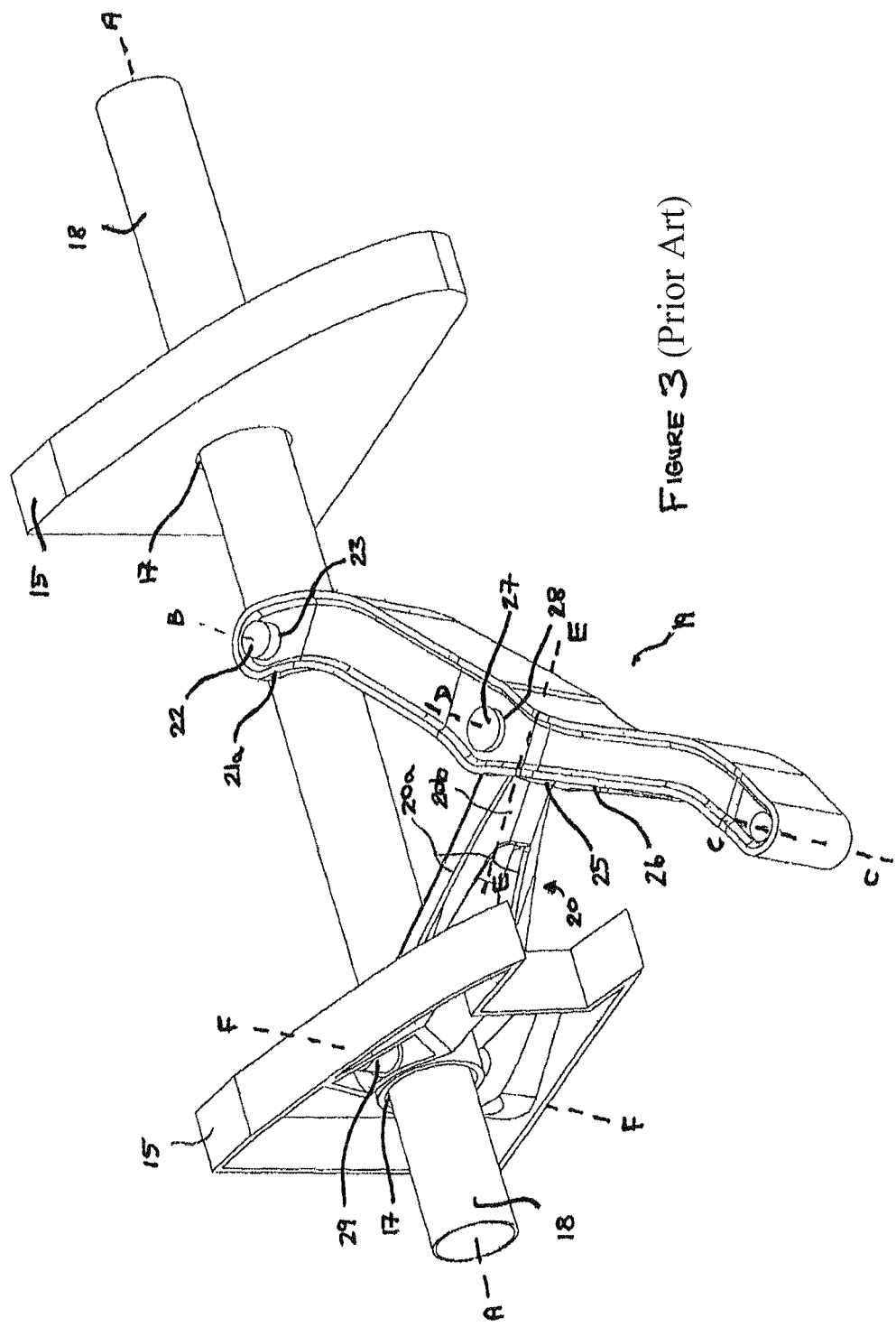
FIG. 3 is a second perspective view of the slat support assembly shown in FIG. 2.
Figure 4:
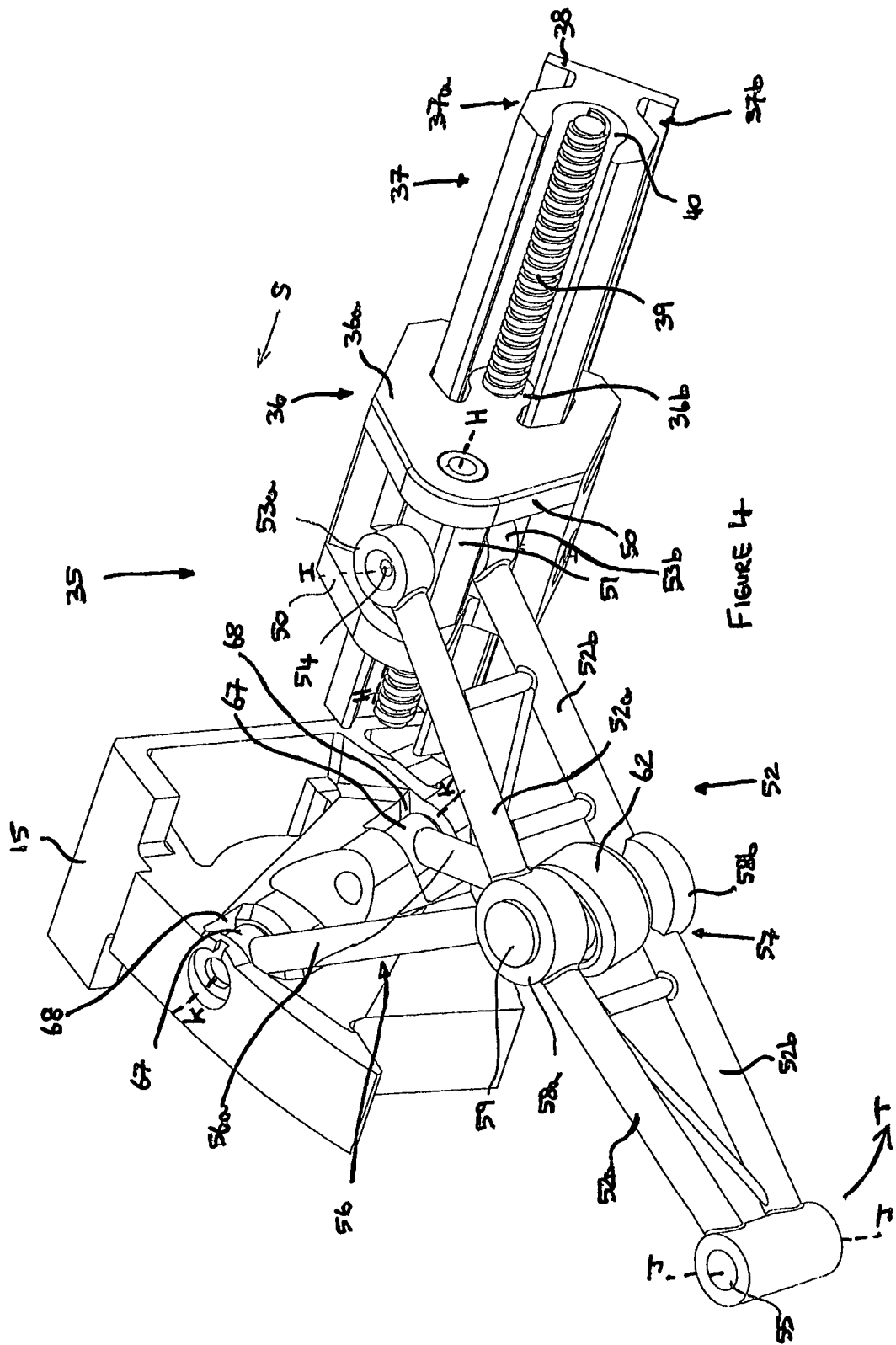
FIG. 4 is a perspective view of a slat support assembly according to the present invention.
Figure 5:
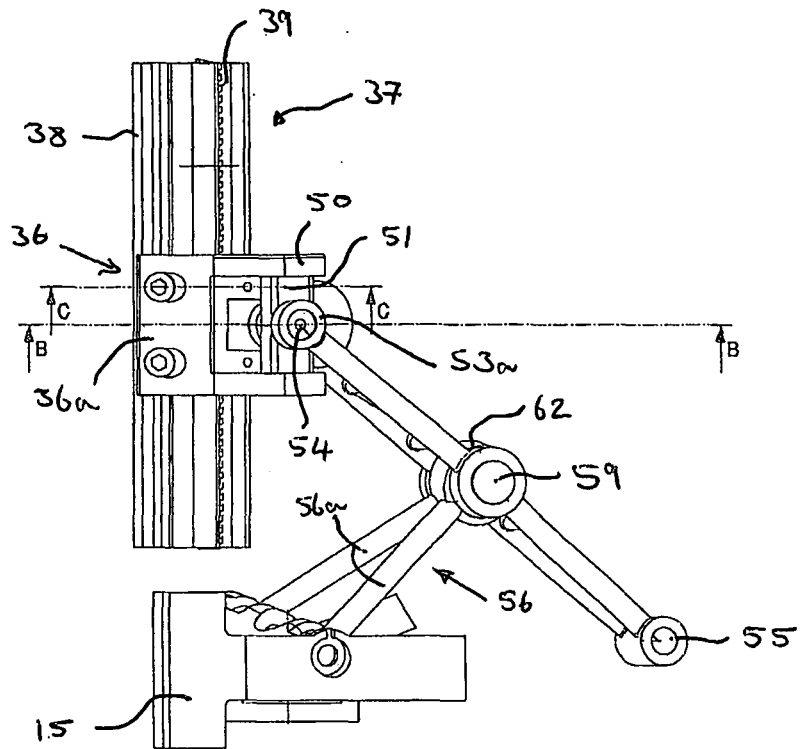
FIG. 5 is a top plan view of the slat support assembly shown in FIG. 4.
Figure 6:
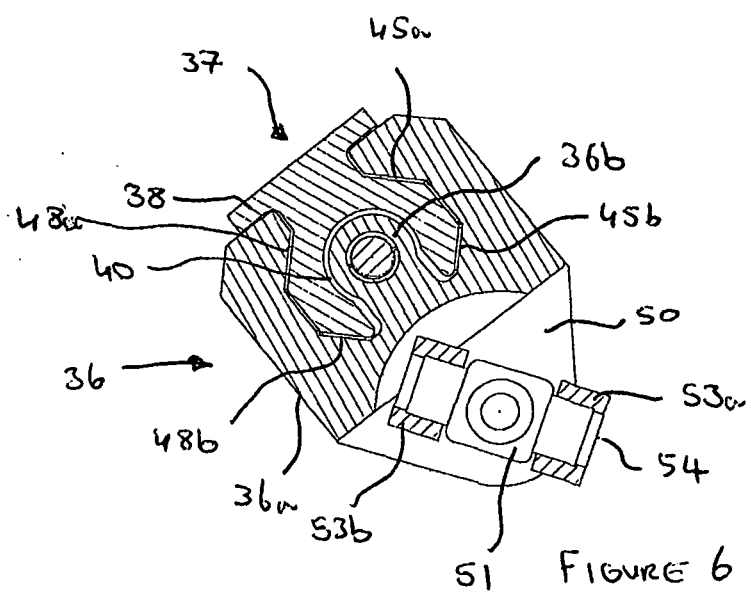
FIG. 6 is a cross-sectional view taken along the line B-B in FIG. 5.

Referring primarily to FIG. 4, there is shown a slat support assembly 35 according to the present invention which employs a modified scissor mechanism similar that previously described. Fundamentally, the assembly of the present invention no longer relies on a slideable and rotatably mounted tube. Furthermore, the connection between the primary and secondary support arms has been modified.

Referring to FIGS. 4 to 8, the assembly 35 comprises a carriage 36 having a body 36a mounted on an elongate track 37. The track 37 is rigidly attached to the wing structure of an aircraft so that it remains stationary relative to the rib 15. The track 37 has a flange 38 that may be placed against part of the wing structure. Holes (not shown) may extend through the flange 38 to allow bolts or other conventional fasteners to be inserted therethrough to facilitate attachment of the track 37 to the wing structure. The track 37 also has a carriage mounting portion 37a attached to the flange 38 via a thinner, necked region 37b.

A rotatable threaded drive shaft 39 extends along the track 37 within a recess 40 in the track 37 and threadingly engages within a drive coupling portion 36b of the carriage 36 that extends into the recess 40 such that, when the threaded shaft 39 rotates, in response to rotation of a drive motor drivingly coupled to the shaft 39, the carriage 36 slides along the elongate track 37, its direction depending on the direction of rotation of the shaft 39.

Figure 7:
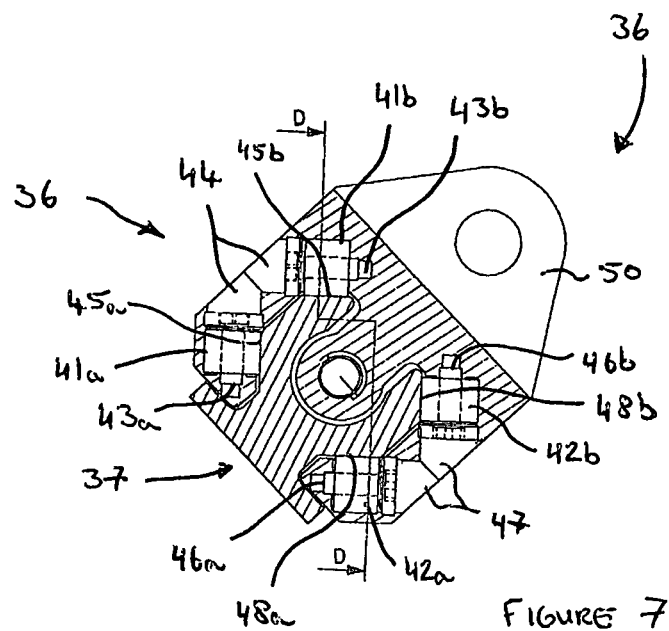
FIG. 7 is a cross-sectional view taken along the line C-C in FIG. 5.
Figure 8:
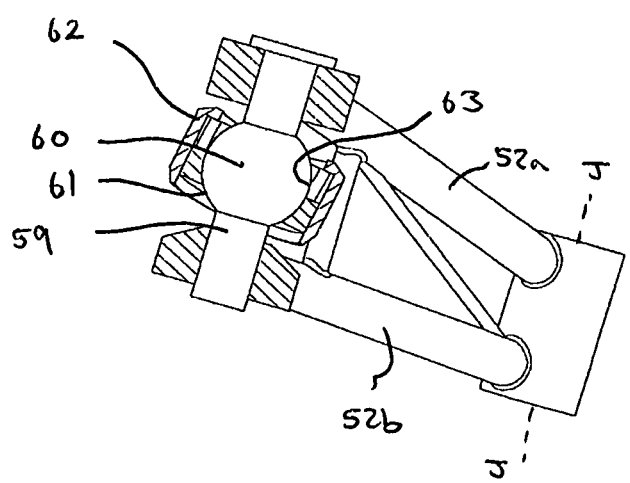
FIG. 8 is a cross-sectional view through the part-spherical bearing shown in FIG. 1.

As most clearly seen in FIG. 7, the carriage 36 is supported on the track 37 by a pair of upper and lower bearings. The upper bearings 41a, 41b are rotatably mounted on separate angled shafts 43a, 43b, each inserted into a recess 44 in the body 36a through an opening in the body 36a of the carriage 36. First upper bearing 41.a lies in rolling contact with a first upper angled bearing surface 45a formed on the track 37 whilst second upper bearing 41b lies in rolling contact with second upper angled bearing surface 45b formed on the track 37. The shafts 43a, 43b are angled such that the axis of rotation of each of the bearings 41a, 41b is parallel to their corresponding upper bearing surfaces 45a, 45b. Preferably, the angle between the axis of rotation of upper bearing 41a is at 90 degrees to the axis of rotation of the other upper bearing 41b.

The lower bearings 42a, 42b are also rotatably mounted on separate angled shafts 46a, 46b, received within a recess 47 in the carriage 36. First lower bearing 42a lies in rolling contact with a first lower angled bearing surface 48a on carriage 37 whilst second lower bearing 42b lies in rolling contact with second lower angled bearing surface 48b on carriage 36. The shafts 46a, 46b are angled such that the axis of rotation of bearings 42a, 42b is parallel to its corresponding lower bearing surface 48a, 48b. The angle between the axis of rotation of lower bearing 42a can be at 90 degrees to the axis of rotation of the other lower bearing 42b. This angled configuration of upper and lower bearings and bearing surfaces means that the bearings can support and counteract loads acting against the carriage 36 in multiple directions including both vertical and horizontal loads.

The carriage 36 has spaced parallel wall portions 50 extending from the body 36a between which is mounted an axle 51 having a generally square-shaped cross-section. The axle 51 is mounted to the carriage 36 for rotation about its longitudinal axis 'H' relative to the carriage 36.

The primary support arm 52 has a pair of upper and a pair of lower arm portions or legs 52a, 52b. Each of the upper arm portions 52a and each of the lower arm portions 52b extend from a cylindrical mounting boss 53a, 53b located at one end of the upper and lower arm portions 52a, 52b. The axle 51 locates in the space between these mounting bosses 53a, 53b at the end of each arm portion 52a, 52b and the primary support arm 52 is coupled to the axle 51 by a pin (not shown) that extends through the axle 51 and a hole 54 in each mounting boss 53a, 53b, thereby pivotally connecting the primary support arm 52 to the axle 51 for rotation about an axis 'I', which is at 90 degrees to axis 'H'. The pivotal connection of the axle 51 to the carriage 36 for rotation about axis 'H' and the pivotal connection of the primary support arm 52 to the axle 51 for rotation about axis 'I' together form a universal joint to enable free movement of the primary support arm 52 relative to the carriage 36 as the carriage 36 slides along the guide track 37.

As with the previously described scissor mechanism, the primary support arm 52 has a cylindrical aperture 55 at its opposite end to receive a pin (not shown) so as to pivotally couple the primary support arm 52 to the slat for rotation about an axis J.

The secondary support or control arm 56 is coupled to the primary support arm 52 between opposite ends of the primary support arm 52 via a spherical ball joint assembly 57. The primary support arm portions 52a, 52b each have an intermediate mounting boss 58a, 58b positioned between each of the upper arm portions 52a and each of the lower arm portions 52b roughly midway along the length of the primary support arm 52. Each of the mounting bosses 58a, 58b are parallel to and spaced from each other. A shaft 59 is connected to and extends between the intermediate mounting bosses 58a, 58b and has a central part-spherical region 60 that forms a male bearing seat or surface 61 (see FIG. 8). One end of the control arm 56 that connects to the primary support arm 52 has a collar 62 that defines an inner or female part spherical bearing surface 63 that locates around, and mates with, the part spherical bearing surface 61 formed on the pin 59 so that the control arm 56 can rotate relative to the primary support arm 52 in all directions.

Similar to the arm portions 7b of the control arm 7 of the previous arrangement, the control arm 56 of the invention comprises support arm portions 56a. According to the invention, the support arm portions 56a diverge at an angle away from the collar 62 and, from each other. Each support arm portion 56a terminates in an annular member 67 that is received within an opening 68 in the rib 15. A pin (not shown) is associated with each annular member 67 and locates in the rib 15 so that it passes through each annular member 67 to facilitate pivotal connection of each annular member 67 to the rib 15.

Axes I and J at opposite ends of the primary support member 52 are parallel to each other and remain so during deployment and retraction of the slat. However, it will be noted that axis K extending through the annular members 67 is at an angle relative to axes I and J i.e. it is displaced through a compound angle in both directions so that it is rotated about the longitudinal axis H of the axle 51 as well as being displaced through an angle such that it not perpendicular to the longitudinal axis H. As with the previous arrangement described above, this arrangement produces an arcuate path to the free end of the primary support arm 52 when the carriage 36 slides laterally along the track 37 and the primary support arm 52 rotates about axes H and I.

To deploy a slat coupled to the primary support arm 52, the motor is driven to rotate the threaded shaft 39 so that the carriage 36 moves in a first direction S along the track 37. As the carriage 36 moves, the primary support arm 52 rotates relative to the carriage 36 about the axis I, and also relative to the control arm 56 about the spherical joint 57. At the same time, the axle 51 rotates about its axis H such that the primary support member 52 also moves downwardly, the spherical ball joint 57 between the primary and secondary support members 52, 56 allowing this movement. As a result, the free end of the primary support arm 52 follows an arcuate path in an outward direction away from the track 37, i.e. in the direction of arrow 'T' in FIG. 4.

To retract the slat, the direction of rotation of the threaded shaft 39 is reversed so that the carriage 36 moves along the track 37 in the opposite direction thereby causing the primary support member 52 to follow a return arcuate path back towards the track 37.

Figure 9:
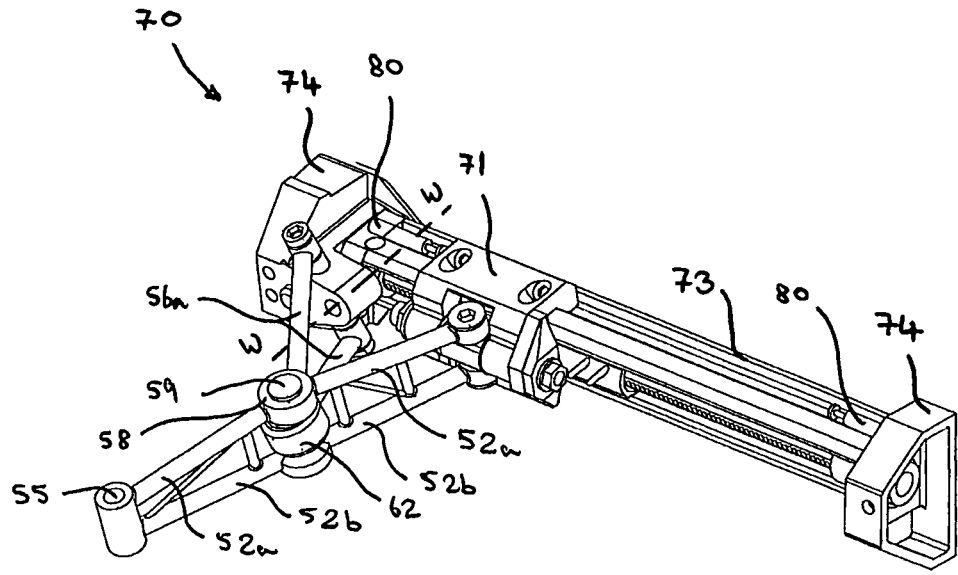
FIG. 9 us a perspective view of a slat support assembly according to another embodiment of the invention.
Figure 10:
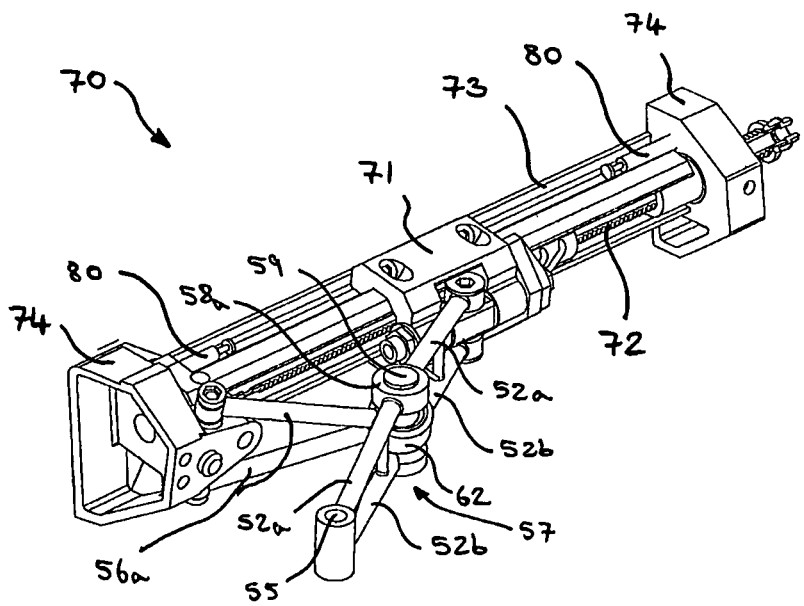
FIG. 10 is another perspective view of the slat support assembly shown in FIG. 9.

The slat support assembly 70 shown in FIGS. 9 and 10 is similar to the slat support assembly already described above and so like components will not be described again. However, the slat support assembly 70 of FIGS. 9 and 10 has been modified so that movement of the carriage 71 is now controlled by a re-circulating ball-screw 72 which optionally replaces the threaded drive shaft 39 of the previous embodiment. However, it will also be appreciated that a conventional lead screw can also be, employed in any embodiment of the invention.

In this modified embodiment, the track 73 is no longer provided with a flange to mount it to the wing structure.

Instead, the track 73 is mounted to stub ribs 74 that are attached to the spar or wing-box. The track 73 may be pivotally mounted to the stub rib 74 for rotation about an axis in the plane of wing bending (as shown by axis 'W' in FIG. 9) to accommodate loads caused by wing bending by allowing the track 73 to pivot relative to the rib 74 to which it is attached. It will be appreciated that, because the track 73 is only fixed at its ends, the carriage 71 may be modified so that it extends around or encloses the track 73 along which it slides. The pivotal attachment of the track 73 to the wing structure via a limited travel floating joint allows small vertical wing bending related movements but restricts horizontal travel.

It will be noted that the track 73 includes travel limit dampers 80 at each end to cushion movement of the carriage 71 when it reaches the limit of movement at either end of the track 73.

Another embodiment of the support assembly of the invention will now be described with reference to FIGS. 11 and 12 of the accompanying drawings. Although the fundamental principles described above in relation to the previous embodiments remain the same, this embodiment differs primarily in that instead of mounting the primary support arm to the carriage for rotation about two axes, the primary support arm is mounted to the carriage for rotation about a single axis and the guide track itself is mounted to a fixed part of the aircraft for rotation about a second axis so that, when the carriage is driven along the guide track, the control arm causes the primary support arm to rotate relative to the carriage about said single axis and, at the same time, the control arm causes the guide track to rotate about the second axis together with the carriage so that a flap, slat or other aero surface attached to an opposite end of the primary support arm is deployed and retracted along an arcuate path.

Figure 11:
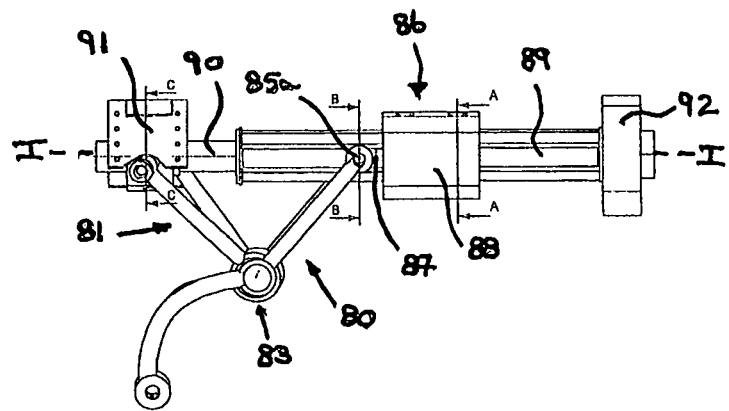
FIG. 11 shows a plan view of the support assembly according to another embodiment of the invention.
Figure 12:
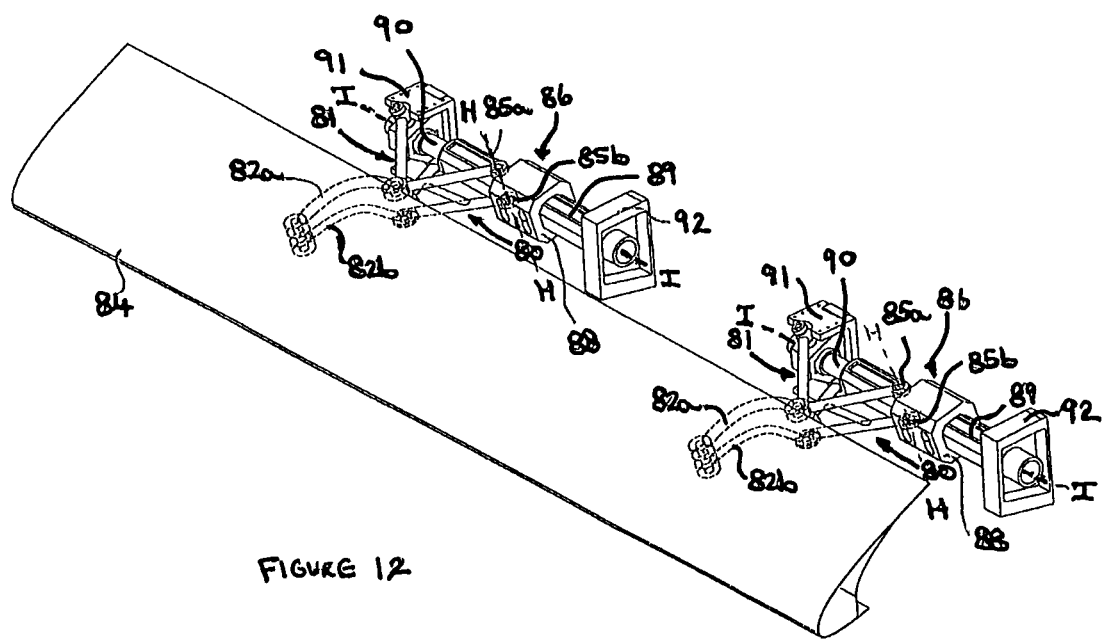
FIG. 12 shows a pair of assemblies attached to a slat that depends from the leading edge of an aircraft wing.

FIG. 11 shows a plan view of the support assembly according to this embodiment of the invention and FIG. 12 shows a pair of the assemblies attached to a slat that depends from the leading edge of an aircraft wing. Although the support assembly is shown for use in the deployment of a slat, it may also be used to deploy a flap or any other aero surface. The construction of the primary support arm 80 and the control arm 81 is generally similar to the primary support arm 52 and control arm 56 of the embodiment of FIGS. 4 to 8, except that a part of the upper arm portions 82a, 82b that extend between the spherical ball joint assembly 83 to the slat 84 are generally curved in shape, and so these components will not be described again.

In this embodiment, mounting bosses 85a, 85b at end of the primary support arm 80 remote from the slat 84 are pivotally attached to the carriage 86 for rotation about a single axis H-H. It will be noted that, in this embodiment, the connection of the primary support arm 80 to the carriage 86 is offset to one side of the carriage and the mounting bosses 85a, 85b attach to a flange 87 fixed to and extending from the carriage body 88. The carriage body 88 also takes the form of a collar that extends completely around the guide track 89.

Figure 13:
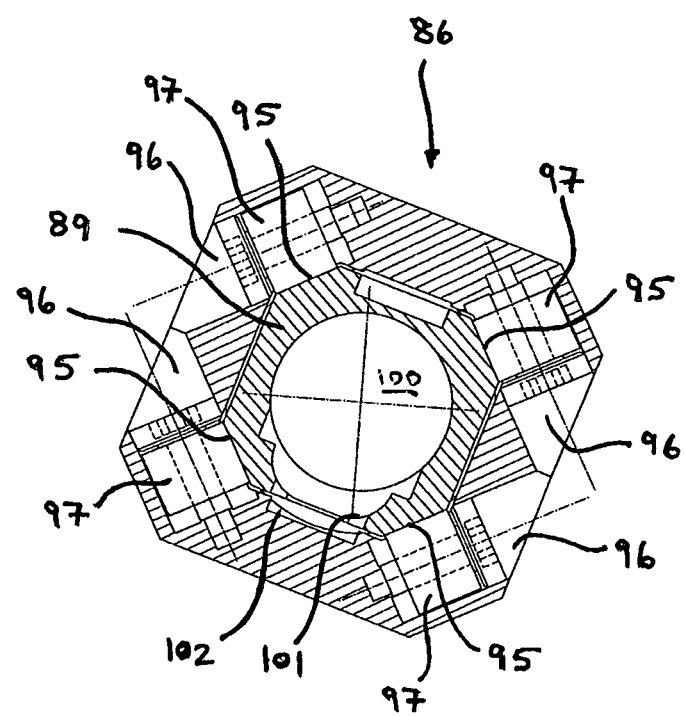
FIG. 13 shows a cross-section through the carriage, along lines A-A in FIG. 11.

The carriage 86 contains bearings (not shown) that rollably mounts the carriage 86 to the guide track 89, as described with reference to the previous embodiments. A cross-section taken along line A-A in FIG. 11 is shown in FIG. 13, from which it can be seen that the guide track 89 has four bearing surfaces 95 spaced from each other at 45 degree angles and extending along the length of the guide track 89. The carriage 86 defines eight pockets 96 in two sets of four positioned next to each other (only one set being visible in FIG. 13). Each pocket receives and rotatably mounts a cylindrical roller bearing 97 therein with their curved bearing surfaces in rolling contact with a respective bearing surface 95 on the guide track 89.

The carriage 86 is driven along the guide track 89 using a ball screw (not shown) in a similar way to the previously described embodiments. However, in this embodiment, the guide track is hollow (see opening 100 in FIG. 13) and the ball screw extends along its longitudinal axis within it. A slot 101 is formed in the wall of the guide track 89 so that a nut received on the ball screw extends through the slot 101 and cooperates with a groove 102 formed on an inner wall of the carriage 86. When the ball screw rotates, the nut is constrained from rotation and so travels along the ball screw together with the carriage 86 which is engaged by the nut.

The guide track 89 includes cylindrical end portions 90 extending from each end that are received within openings in ribs 91, 92 that form part of the structure of the aircraft wing. The cylindrical end portions 90 are rotatably mounted within their openings so that the guide track 89 is mounted for rotation about its longitudinal axis I-I.

When the carriage 86 is slideably driven along the guide track 89, the primary support member rotates relative to the carriage 86 about axis H-H due to the influence of the control arm 81. The control arm 81 also causes the guide track 89 to rotate about its axis I-I, the net result being that the opposite end of the primary support arm 80, and a slat 84, or other aero surface attached thereto, follows an arcuate deployment or retraction path, depending on the direction in which the carriage 86 is driven along the guide track 89.

It will be appreciated that the foregoing description is given by way of example only and that modifications may be made to the slat support assembly of the present invention without departing from the scope of the appended claims.

The invention claimed is:

1. A support assembly for deployment and retraction of an aero surface from an aircraft, the assembly comprising:
   a guide track mounted to a fixed support,
   a primary support arm having one end coupled to a carriage mounted on the track such that the primary support arm is configured to rotate relative to the guide track at least about a first axis parallel with the guide track and about a second axis extending at right angles to the guide track, and
   a control arm having one end coupled to the primary support arm and a second end pivotably attached to a fixed support for rotation about a third axis, wherein said guide track, said primary support arm and said control arm are configured to require said control arm to rotate about the third axis to cause said primary support arm to pivot about said second axis when the carriage is driven along the guide track, wherein the control arm is also configured to cause said primary support arm to pivot about said first axis when the carriage is driven along the guide track, and said aero surface is deployed or retracted along an arcuate path.

2. A support assembly according to claim 1, wherein said one end of the control arm is coupled to the primary support arm at a position spaced from either end of said primary support arm.

3. A support assembly according to claim 1, wherein the primary support arm is rotatable relative to the carriage about a first axis.

4. An aircraft wing assembly, including a slat and a support assembly according to claim 1 to control deployment and retraction of said slat.

5. An aircraft wing assembly, including a flap and a support assembly according to claim 1, to control deployment and retraction of said flap.

6. A support assembly according to claim 1, comprising a drive member extending along the fixed guide track, the drive member being coupled to the carriage such that the carriage is movable along the guide track in response to rotation of the drive member.

7. A support assembly according to claim 6, wherein the guide track comprises a recess extending along its length, the drive member being received within said recess.

8. A support assembly according to claim 7, wherein the carriage includes a drive coupling portion that is received in said recess when said carriage is mounted on the track.

9. A support assembly according to claim 8, wherein the drive member comprises a threaded shaft that extends through the drive coupling portion of the carriage and mates with a complimentary thread formed therein such that the carriage moves along the guide track in response to rotation of the threaded shaft.

10. A support assembly according to claim 1, wherein the primary support arm is rotatable relative to the carriage about multiple axes so that an aero surface pivotally attached to an opposite end of the primary support member is deployed and/or retracted along an arcuate path.

11. A support assembly according to claim 10, wherein the first and second axes are 90 degrees to each other.

12. A support assembly according to claim 1, wherein the primary support member comprises a pair of upper and a pair of lower arm portions, each of the upper arm portions and each of the lower arm portions extending in opposite directions from an intermediate mounting boss located between the ends of the primary support member.

13. A support assembly according to claim 1, when used to control the deployment or retraction of a slat or flap from an aircraft wing, wherein the guide track is pivotally mounted to a fixed rib forming the structure of the aircraft wing at one end, for pivotal movement about an axis in a plane of wing bending.

14. A support assembly according to claim 12, wherein a shaft extends between the intermediate mounting bosses of the upper and lower arm portions, said shaft including a part-spherical male bearing surface.

15. A support assembly according to claim 14, wherein the control arm has a collar at one end defining a part-spherical female bearing surface that mates with the male bearing surface on the shaft such that the control arm and primary support member can rotate relative to each other in any direction about said spherical bearing.

16. A support assembly for deployment and retraction of an aero surface from an aircraft, the assembly comprising:
   a guide track,
   a primary support arm having one end coupled to a carriage mounted on the track such that the primary support arm is rotatable relative to the carriage, and
   a control arm having one end coupled to the primary support arm and a second end pivotably attachable to a fixed support, wherein the assembly is configured such that, when the carriage is driven along the guide track, the control arm causes the primary support arm to pivot relative to the carriage to deploy or retract said aero surface pivotally attached to an opposite end of the primary support member, wherein the guide track has a mounting flange for connection of the guide track to a fixed support forming part of the structure of the aircraft, and a carriage mounting portion extending from said mounting flange, the flange and carriage mounting portion being connected to each other by a necked region.

17. A support assembly according to claim 16, wherein the carriage has an opening to receive the carriage mounting portion of the guide track such that the carriage mounting portion is surrounded by the carriage with the carriage mounting portion extending through said opening.

18. A support assembly according to claim 17, wherein the opening in the carriage has overhanging regions that extend into a space between the flange and the carriage mounting portion towards the necked region so that the carriage surrounds the carriage mounting portion.

19. A support assembly according to claim 17, wherein the carriage mounting portion has an outer surface that defines a plurality of bearing surfaces that extend along the length of the guide track.

20. A support assembly according to claim 19, wherein the carriage has bearing apertures therein and bearings received in said apertures with bearing surfaces that lie in rolling contact with the bearing surfaces on the carriage mounting portion.

21. A support assembly according to claim 20, wherein the carriage mounting portion has two upper bearing surfaces and two lower bearing surfaces, each of the upper and each of the lower bearing surfaces being arranged at an angle relative to its other upper and lower bearing surface, respectively.

22. A support assembly according to claim 21, wherein the apertures in the carriage includes two upper angled bearing apertures mounting upper bearings with their axes of rotation at an angle to each other corresponding to the angle of the upper bearing surfaces and, two lower bearing apertures mounting lower bearings with their axes of rotation at an angle to each other corresponding to the angle of the lower bearing surfaces.

23. A support assembly according to claim 22, wherein the angle between each of the upper bearings and each of the lower bearings is 90 degrees, respectively.

24. A support assembly for deployment and retraction of an aero surface from an aircraft, the assembly comprising:
   a guide track,
   a primary support arm having one end coupled to a carriage mounted on track such that the primary support arm is rotatable relative to the carriage, and
   a control arm having one end coupled to the primary support arm and a second end pivotably attachable to a fixed support, wherein the assembly is configured such that, when the carriage is driven along the guide track, the control arm causes the primary support arm to pivot relative to the carriage to deploy or retract said aero surface pivotally attached to an opposite end of the primary support member, wherein the primary support arm is rotatable relative to the carriage about multiple axes so that an aero surface pivotally attached to an opposite end of the primary support member is deployed and/or retracted along an arcuate path, wherein the carriage comprises a body, the body also comprising spaced parallel wall portions extending therefrom in a direction away from the guide track, the carriage also comprising an axle that extends between, and is pivotally mounted to, the spaced parallel wall portions for rotation of the axle about a first axis relative to the body, said one end of the primary support member being coupled to said axle.

25. A support assembly according to claim 24, wherein said one end of the primary support member is pivotally coupled to the axle for rotation about a second axis relative to the axle and to the carriage.

26. A support assembly for deployment and retraction of an aero surface from an aircraft, the assembly comprising:
   a guide track,
   a primary support arm having one end coupled to a carriage mounted on the track such that the primary support arm is rotatable relative to the carriage, and a control arm having one end coupled to the primary support arm and a second end pivotably attachable to a fixed support, wherein the assembly is configured such that, when the carriage is driven along the guide track, the control arm causes the primary support arm to pivot relative to the carriage to deploy and/or retract said aero surface pivotally attached to an opposite end of the primary support member, wherein the primary support arm is rotatable relative to the carriage about a first axis, wherein the guide track is mounted for rotation about a second axis extending along the length of the guide track so that, when the carriage is driven along the guide track, the control arm causes the primary support arm to pivot about said first axis, the control arm also causing the guide track to pivot about said second axis, together with said carriage and the primary support arm, so that an aero surface pivotally attached to an opposite end of the primary support member is deployed and/or retracted along an arcuate path.

27. A support assembly for deployment and retraction of an aero surface from an aircraft, the assembly comprising:

a guide track mounted to a fixed support;

a primary support arm having one end coupled to a carriage mounted on the track such that the primary support arm is configured to rotate relative to the carriage about at least a first axis extending at right-angles to the guide track and wherein the guide track and carriage are rotatable relative to a fixed support about a second, longitudinal, axis of the guide track; and a control arm having one end coupled to the primary support arm and a second end pivotably attached to a fixed support for rotation about a third axis, wherein said guide track, said primary support arm and said control arm are configured to require the control arm to rotate about the third axis to cause the primary support arm to pivot about the first axis, wherein the control arm is also configured to cause the primary support arm to pivot about the second, longitudinal, axis when the carriage is driven along the guide track and said aero surface is pivotally attached to an opposite end of the primary support member and is deployed or retracted along an arcuate path.

\* \* \* \* \*